UNITED STATES PATENT OFFICE.

FRANCIS MITCHELL McCLENAHAN, OF MARYVILLE, TENNESSEE.

METHOD OF SMELTING IRON ORES.

1,066,833.  Specification of Letters Patent.  Patented July 8, 1913.

No Drawing.  Application filed April 17, 1913. Serial No. 761,824.

*To all whom it may concern:*

Be it known that I, FRANCIS M. McCLENAHAN, a citizen of the United States, residing at Maryville, in the county of Blount and State of Tennessee, have invented a new and useful Method of Smelting Iron Ores, of which the following is a specification.

This invention has reference to improvements in the method of smelting iron ores, and its object is to render commercially practicable the smelting of certain iron ores, particularly aluminiferous iron ores. In certain parts of the United States there are vast deposits of such aluminiferous iron ores, chief among which may be mentioned the fossiliferous porous red hematite known as the Clinton-Rockwood formation. Various expedients have been employed to render such ores economically available for the production of iron. Sometimes the ore is self-fluxing, wherefore the problem of disposal of the non-ferrous components thereof is reduced to the minimum of difficulty provided the body of slag is not out of proportion to the body of the iron output. Where the ore is not self-fluxing it has been the custom to balance the silica with the proper amount of limestone or dolomite, and in order to reduce the slag burden of the furnace there is frequently added a sufficient amount of brown hematite. Many of the deposits of red hematite, however, are so situated that the brown hematite needed must be transported for a considerable distance and in some instances the readily available deposits of brown hematite have become exhausted.

It has heretofore been deemed necessary to employ brown hematite to lower the slag burden of the furnace in the smelting of relatively low grade red hematites, and although the brown ore, being lean in silicious material and rich in iron, lowers the slag burden of the furnace and thereby lessens the fuel expense in proportion to the output of iron, yet the great cost of laying it down at the furnace located in the region of the red hematite frequently renders its use prohibitive for furnace purposes. This together with the relatively high percentage of aluminiferous materials in the red fossil ores has led to the considering of vast deposits of such red fossil ores as non-available for the economic production of iron.

Numerous analyses of the red fossil ores under consideration have disclosed the fact that they contain a marked content of aluminum oxid. Such content being but weakly basic toward silica and weakly acidic toward basic fluxes, such as lime and magnesia, does not lend itself readily to the formation of a compound with either of these two classes of reagents. When aluminum oxid unites chemically with calcium oxid, calcium aluminate is formed. When aluminum oxid unites chemically with silica, aluminum silicate is formed. Neither of these substances, however, is readily fusible to the liquid condition. It is apparent, therefore, that the presence of a marked amount of aluminum oxid is a disturbing factor in the prevailing custom of balancing silica against calcium oxid in the form of limestone, or calcium and magnesia oxids in the form of dolomite.

An addition of lime or magnesia to the charge of a blast furnace for the purpose of fluxing the silica, and thereby forming calcium or magnesia silicate, produces a vitreous slag. However, if aluminum oxid is in the ore, either as free aluminum oxid or as combined aluminum silicate, the fusion point of the slag will be raised thereby. There is sometimes employed the expedient of increasing the silica in the charge, which with the limestone also added, will increase the volume of the more fusible calcium silicate, and thus aid in the elimination of the less fusible aluminum silicate. But this adds to the slag burden of the furnace and, therefore, to the fuel burden and when the percentage of the non-ferrous materials in the ore is already high, the slag burden becomes prohibitive, unless a high grade ore, such as brown hematite, is at hand to make the ratio of slag to iron output of the furnace more nearly conformable to good metallurgical practice.

By the present invention certain red hematites may be smelted at a cost which renders many otherwise useless deposits highly valuable, since the invention permits a lowering of the cost of production commensurate with the low cost at which red hematite may be obtained.

In accordance with the present invention chlorid of sodium is employed as the flux for the non-ferrous aluminiferous materials naturally occurring in iron ores and may be used in the form of rock salt, which is obtainable at a low cost, and even though the cost of the chlorid of sodium or salt should be considerably more than that of the same quantity of limestone, the quantity of salt by weight needed is so much less than the quantity of limestone that there is a radical lowering of the fuel burden of the furnace in the melting zone. However, it should be understood that the use of sodium chlorid as a fluxing agent for the smelting of the non-ferrous aluminiferous materials of iron ores does not mean that there may not arise occasion from time to time which may require the use of some basic flux such as limestone or dolomite or some acidic flux along with the sodium chlorid to accomplish a proper smelting of the ore. The quantity of chlorid of sodium may range from about one-fifth to about one-seventh of the total aluminum oxid content of the ore to be smelted. These proportions have been tried on certain red hematites, but the exact limits have not yet been determined. It appears, however, that the amount of this flux required is but a small fraction of that necessary when lime is employed, if indeed lime is practicable with the aluminiferous red ore alone and without the addition of brown ore to the charge.

The so-called insolubles in certain classes of ores which are smeltable only with difficulty are found to be silicates, either neutral or basic, and, therefore, another flux than those used in the present day practice is called for. I have discovered that sodium chlorid is a practicable flux for the basic and neutral silicates, which latter have heretofore prevented satisfactory smelting of the red hematites in question.

The more intimately two chemically reacting substances are associated, the more readily is their interaction accomplished, other physical conditions being equal. On account of the gaseous nature of vaporous molecules they tend to penetrate solids thoroughly and their intimacy of association therewith has an extent that is out of all proportion to any possible intimacy of association of two solids. In case two solids react chemically the corrosion takes place only at the colliding surfaces. The interiors of the two solids are unaffected until they in turn become surfaces. In a blast furnace, in which limestone is used as a flux, the surfaces of the particles of lime come into intimate contact with the surfaces of the lumps of ore. The lime does not penetrate the ore, but at the surfaces of the lumps of ore there is a reaction under the thermal conditions of the furnace and a fusible slag is produced at the surfaces but not within the deeper parts. When this slag flows away there is a new surface exposed for further action of the lime and the corrosion is seen to progress inward toward the center of the lump or particle of ore. Only by surface corrosion is the non-ferrous material of the ore finally brought to the fusible condition when the flux is non-vaporizable at the heat of the furnace. With a vaporizable flux such as sodium chlorid or the like there is no pore of the ore that is not susceptible to penetration on the part of the vapor and therefore the intimate contact of the ore and the flux is rendered thereby most thoroughgoing and complete and when the thermal conditions of the furnace are favorable the fluxing of the descending body of non-ferrous material of the ore takes place throughout the whole body of the lump or particle of ore coincident with the surface corrosion and not at the surface only. The fluxing of the lump of ore is more of the nature of collapse than a surface corrosion.

In ordinary practice a ton of ore requires about a ton of limestone or similar basic fluxing agent to effect fusion of the non-ferrous materials in the ore. By the process of the present invention the fluxing agent need not add more than about one-tenth of a ton to the burden of the furnace for each ton of ore to be smelted. I have found that practically a much less proportion has given perfect satisfaction in the fluxing of the non-ferrous components of the ore. By the use of limestone as a flux the furnace is required to smelt approximately two tons of material for every ton of ore reduced. By the present invention the furnace is required to smelt not more than about one and one-tenth tons of material for every ton of ore reduced. It is evident that this greatly reduces the fuel cost in the production of pig iron.

Sodium chlorid so fuses with the aluminiferous components of fossil or other red iron ores that a slag is obtained from which the reduced metallic iron easily and readily separates. The use of sodium chlorid as a flux with the fossiliferous red iron ores obviates the necessity of employing brown ore with the red ore in the charges of the furnace and the cost of the brown ore is thereby eliminated.

Vast deposits of red ores which have been heretofore practically worthless because of the high cost of smelting are by the present invention rendered available for obtaining iron.

What is claimed is:—

1. The method of fluxing aluminiferous iron ores, which consists in smelting such ores in the presence of sodium chlorid.

2. The method of fluxing aluminiferous iron ores which consists in smelting such ores in the presence of sodium chlorid as the fluxing agent.

3. The method of fluxing aluminiferous iron ores, which consists in smelting such ores in the presence of a fluxing agent which is volatile at the heat of the furnace.

4. The method of fluxing aluminiferous iron ores, which consists in smelting such ores in the presence of sodium chlorid in the proportion of about one-fifth to about one-seventh of the aluminum oxid content of the ore to be smelted.

In testimony, that I claim the foregoing as my own, I have hereto affixed my signature in the presence of two witnesses.

FRANCIS MITCHELL McCLENAHAN.

Witnesses:
L. T. WALKER,
GRACE GODDARD.

Copies of this patent may be obtained for five cents each, by addressing the "Commissioner of Patents, Washington, D. C."